US008581925B2

(12) United States Patent
Lee et al.

(10) Patent No.: US 8,581,925 B2
(45) Date of Patent: Nov. 12, 2013

(54) METHOD OF CORRECTING DATA AND LIQUID CRYSTAL DISPLAY USING THE SAME

(75) Inventors: Dongyou Lee, Seoul (KR); Sunah Park, Anyang-si (KR); Hoyoung Jung, Goyang-si (KR)

(73) Assignee: LG Display Co. Ltd., Seoul (KR)

( * ) Notice: Subject to any disclaimer, the term of this patent is extended or adjusted under 35 U.S.C. 154(b) by 563 days.

(21) Appl. No.: 12/579,706

(22) Filed: Oct. 15, 2009

(65) Prior Publication Data

US 2011/0025721 A1    Feb. 3, 2011

(30) Foreign Application Priority Data

Jul. 31, 2009    (KR) .................. 10-2009-0070509

(51) Int. Cl.
*G09G 5/02* (2006.01)
*G06K 9/00* (2006.01)

(52) U.S. Cl.
USPC ........... 345/604; 345/589; 345/593; 345/600; 345/601; 345/602; 345/603; 382/162; 382/167

(58) Field of Classification Search
USPC .......... 345/589, 593, 600–604; 382/162, 165, 382/167
See application file for complete search history.

(56) References Cited

U.S. PATENT DOCUMENTS

| | | | |
|---|---|---|---|
| 6,961,037 B2 * | 11/2005 | Kuwata et al. | 345/88 |
| 2003/0117413 A1 * | 6/2003 | Matsuda | 345/589 |
| 2005/0248784 A1 * | 11/2005 | Henley et al. | 358/1.9 |
| 2005/0275911 A1 * | 12/2005 | Yamada et al. | 358/518 |
| 2006/0187233 A1 * | 8/2006 | Diefenbaugh et al. | 345/591 |
| 2006/0195278 A1 * | 8/2006 | Lianza et al. | 702/69 |
| 2006/0221396 A1 * | 10/2006 | Sloan | 358/3.01 |
| 2006/0238480 A1 * | 10/2006 | Furihata et al. | 345/98 |
| 2007/0046958 A1 * | 3/2007 | Hoof et al. | 358/1.9 |

(Continued)

FOREIGN PATENT DOCUMENTS

| | | |
|---|---|---|
| CN | 1404029 A | 3/2003 |
| CN | 101409049 A | 4/2009 |
| KR | 2005-0040296 | 5/2005 |
| WO | WO 2006137312 A1 * | 12/2006 |

OTHER PUBLICATIONS

N. Moroney, M. D. Fairchild, R. W. G. Hunt, C. J. Li, M. R. Luo, and T. Newman, The CIECAM02 color appearance model, in IS&T 10th, 2002, Color Imaging Conference, Scottsdale, pp. 23-27.*

CIE Technical Report, A Colour Appearance Model for Colour Management Systems: CIECAM02, 2004, International Commission on Illumination, ISBN: 978-3-901906-29-9.*

(Continued)

*Primary Examiner* — Aaron M Richer
*Assistant Examiner* — Michael J Cobb
(74) *Attorney, Agent, or Firm* — Brinks Hofer Gilson & Lione

(57) ABSTRACT

A data correcting method is disclosed to implement an optimum picture quality according to surrounding conditions. The data correcting method includes: converting the input data into XYZ color space data; converting the XYZ color space data into JCh color space data by applying a reference illuminance parameter to a CIECAM02 forward algorithm; inversely converting the JCh color space data into the XYZ color space data by the illuminance by sequentially applying a plurality of illuminance parameters different from the reference illuminance, to a CIECAM02 backward algorithm; inversely converting the inversely converted XYZ color space data into an RGB color space to produce correction data of each illuminance; and making a look-up table by mapping the produced correction data of each illuminance to the input data.

7 Claims, 5 Drawing Sheets

(56) References Cited

U.S. PATENT DOCUMENTS

| | | | |
|---|---|---|---|
| 2007/0058181 A1* | 3/2007 | Hatori | 358/1.9 |
| 2008/0056605 A1* | 3/2008 | Shehata et al. | 382/274 |
| 2008/0069439 A1* | 3/2008 | Kwak et al. | 382/162 |
| 2008/0136818 A1* | 6/2008 | Matsuoka | 345/427 |
| 2008/0181493 A1* | 7/2008 | Cho et al. | 382/165 |
| 2009/0267876 A1* | 10/2009 | Kerofsky | 345/87 |
| 2010/0265264 A1* | 10/2010 | Doser et al. | 345/590 |

OTHER PUBLICATIONS

Office Action issued in corresponding Chinese Patent Application No. 200910205794.4, mailed Mar. 19, 2012.

Chai, "A Study of Various Issues of Color Appearance Model CIECAM02" Beijing Institute of Technology Doctoral Paper, Feb. 20, 2006.

Moroney et al., "The CIECAM02 Color Appearance Model," *Society for Imaging Science and Technology*, pp. 23-27 (2002).

* cited by examiner

METHOD OF CORRECTING DATA AND LIQUID CRYSTAL DISPLAY USING THE SAME

This application claims the benefit of Korea Patent Application No. 10-2009-0070509 filed on Jul. 31, 2009, the entire contents of which is incorporated herein by reference for all purposes as if fully set forth herein.

BACKGROUND

1. Field of the Invention

This document relates to a data correcting method capable of implementing an optimum picture quality according to surrounding conditions and a liquid crystal display using the same.

2. Discussion of the Related Art

A liquid crystal display (LCD) displays an image by controlling light transmittance of a liquid crystal layer through fields applied to the liquid crystal layer correspondingly according to video signals. Such an LCD includes a flat panel display device having the advantages of being small and thin and consuming less power, is used for mobile computers such as notebook computers or PCs, office automation equipment, audio/video players, and the like. In particular, an active matrix type LCD having switching elements formed at liquid crystal cells is advantageous for implementing video by actively controlling the switching elements.

Thin film transistors (TFTs) as shown in FIG. 1 are commonly used as the switching elements used for the active matrix type LCD. With reference to FIG. 1, in the active matrix type LCD, digital video data is converted into analog data voltage based on a gamma reference voltage and supplied to a data line DL and, at the same time, scan pulses are supplied to a gate line GL to charge a data voltage in a liquid crystal cell Clc. To this end, a gate electrode of the TFT is connected to the gate line GL, a source electrode of the TFT is connected to the data line DL, and a drain electrode of the TFT is connected to a pixel electrode of the liquid crystal cell Clc and to one electrode of a storage capacitor (Cst). A common electrode Vcom is supplied to a common electrode of the liquid crystal cell Clc. The storage capacitor Cst serves to charge the data voltage applied to the data line DL when the TFT is turned on, and uniformly maintain the voltage of the liquid crystal cell Clc. When the scan pulse is applied to the gate line GL, the TFT is turned on to form a channel between the source and drain electrodes to supply the voltage of the data line DL to the pixel electrode of the liquid crystal cell Clc. At this time, the arrangement of liquid crystal molecules of the liquid crystal cell is changed due to fields between the pixel electrode and the common electrode to modulate incident light.

Various techniques are being developed to enhance the picture quality of a display screen. However, although the physical display screen image has a wide gamut, a change in the surrounding environment of a device such as illuminance hinders a color image from being faithfully reproduced with its original brightness and color sense.

The picture quality of a color image generally depends on three types of color attributes of lightness, chroma, and hue angle. The hue angle represents how close to four primary colors of red, yellow, green, and blue, or to a color obtained by mixing adjacent two primary colors in a certain ratio a given color is seen. The lightness is a relative concept of brightness representing how intensely a given object emits light. Namely, the lightness may be defined as a relative brightness of a particular object with respect to the brightness of a white object (or a white-like object) when the white object and the particular object are illuminated in a similar manner. The chroma is a relative concept of colorfulness representing the degree indicated by a color tone attribute at a given color in its outward appearance. Namely, the chroma may be defined as a relative ratio of the brightness of the white object (or the white-like object) to the colorfulness of the given particular object when the particular object and the white object are illuminated in a similar manner.

The color attributes such as lightness, chroma and hue angle are sensitively reactive to a change in an ambient illuminance, so if an ambient illuminance changes, an observer is bound to receive the same color differently. For example, the observer receives the same color image as being brighter or clearer in a high illuminance state compared to a low illuminance state.

Recently, a Korean Patent Laid Open Publication No. 2005-0040296 has proposed a technique of adjusting the brightness of a backlight according to ambient illuminance. However, this technique simply adjusts a change in the brightness according to an ambient illuminance, without considering a change in a hue angle resulting from a change in illuminance. As a result, this related art cannot change an image to have an optimum lightness, chroma, and hue angle suitably according to a visual sensitivity of a person (e.g., a user) in an ambient illuminance environment, failing to improve a picture quality.

BRIEF SUMMARY

In an aspect of the disclosure, a method for correcting input data to display an image comprises: converting the input data into XYZ color space data; converting the XYZ color space data into JCh color space data by applying a reference illuminance parameter to a CIECAM02 forward algorithm; inversely converting the JCh color space data into the XYZ color space data by the illuminance by sequentially applying a plurality of illuminance parameters different from the reference illuminance, to a CIECAM02 backward algorithm; inversely converting the inversely converted XYZ color space data into an RGB color space to produce correction data of each illuminance; and making a look-up table by mapping the produced correction data of each illuminance to the input data.

In another aspect of the disclosure, a liquid crystal display (LCD) comprises: a liquid crystal panel that has an illuminance sensor and displays an image; a memory configured to store a plurality of previously made look-up tables including correction data of each illuminance produced through a CIECAM02 algorithm; a data processing unit configured to select a pertinent look-up table based on illuminance information from the illuminance sensor and correct input data by using correction data of the selected look-up table; and a display panel driving circuit configured to display the correction data on the liquid crystal panel.

The LCD may further comprise: a timing controller configured to control an operation timing of the display panel driving circuit, wherein the memory and the data processing unit are installed within the timing controller.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Hereinafter, exemplary embodiments of the present invention will now be described with reference to FIGS. 2 to 7.

Figure 1:
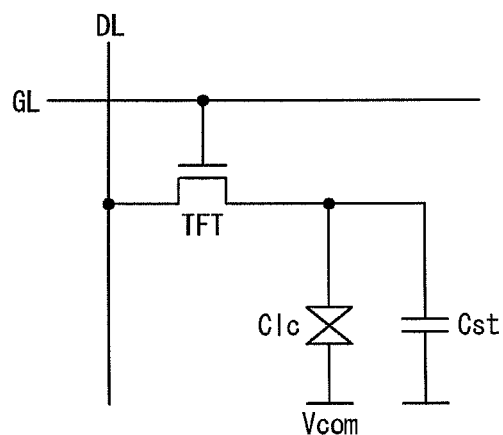
FIG. 1 is an equivalent circuit diagram of a general liquid crystal display (LCD).
Figure 2:
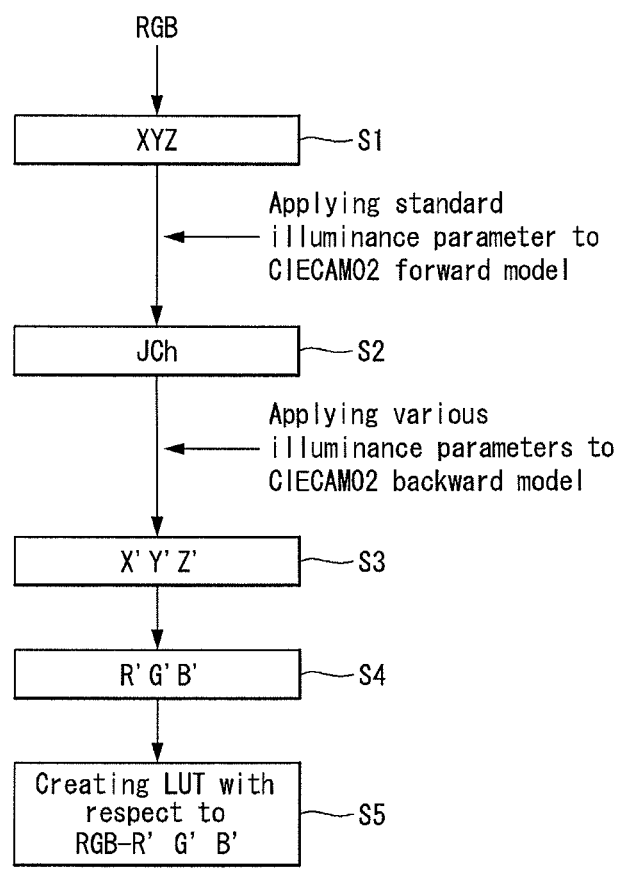
FIG. 2 is a flow chart illustrating the sequential process of a data correcting method according to an exemplary embodiment of the present invention.

FIG. 2 is a flow chart illustrating the sequential process of a data correcting method according to an exemplary embodiment of the present invention.

With reference to FIG. 2, in the data correcting method according to an exemplary embodiment of the present invention, RGB (Red, Green, and Blue) data is received and converted into a CIEXYZ color space by using a normalization algorithm as represented by Equation 1 shown below (S1):

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{linear} \\ G_{linear} \\ B_{linear} \end{bmatrix}$$ [Equation 1]

$$C_{linear} = \begin{cases} \dfrac{C_{srgb}}{12.92}, & C_{srgb} \leq 0.04045 \\ \left(\dfrac{C_{srgb} + 0.055}{1 + 0.055}\right)^{2.4}, & C_{srgb} > 0.04045 \end{cases}$$

Here, 'Csrgb' is a value obtained by normalizing the RGB data to between 0 and 1.

Through the conversion into the CIEXYZ space, the RGB data is changed into a human's perceptual attribute independent from a viewing condition such as external illuminance. In other words, the RGB data is converted into CIEXYZ chromaticity coordinate values (XYZ) independent from the viewing condition.

Next, in the data correcting method according to the exemplary embodiment of the present invention, the CIEXYZ chromaticity coordinates values (XYZ) are converted into a CIEJCh color space by applying a illuminance parameter corresponding to a standard environment of Table 1 shown below to a CIECAM02 forward algorithm (S2).

TABLE 1

| Viewing condition | c | Nc | F |
|---|---|---|---|
| Standard environment | 0.69 | 1.0 | 1.0 |
| Dim environment | 0.59 | 0.9 | 0.9 |
| Dark environment | 0.525 | 0.8 | 0.8 |

In Table 1, 'c', Nc', and 'F' are constant parameters included in the CIECAM02 algorithm, each having a different value according to the viewing condition. As the external illuminance lowers, namely, as the standard environment is changing into the dark environment, the size of the constant parameters diminishes. Table 1 illustrates the constant parameters with respect to three types of illuminance conditions, and the illuminance conditions and their constant parameters may be further segmented into a larger number.

The conversion into the CIEJCh color space makes CIEXYZ chromaticity coordinate values XYZ converted into human's perceptual attributes. The human's perceptual attributes may be understood as color appearance attributes regardless of various viewing conditions such as a white point, a luminous intensity, an ambient illuminance, and the like. CIE proposed CIECAM97, a temporary color appearance model in 1997. The CIECAM97 model is for estimating a corresponding color appearance to obtain color appearance attributes. CIECAM02 revised by CIE in 2002 has an improved performance of predicting a color appearance and a simpler algorithm structure compared with the CIECAM97. In an exemplary embodiment of the present invention, the CIECAM02 algorithm can be used to convert the CIEXYZ chromaticity coordinate values XYZ into CIEJCh chromaticity coordinate values JCh corresponding to the human's perceptual attributes. Here, 'J' is a Recognition Lightness Composition, 'C' is a Recognition Chroma Composition, and 'h' is a Recognition Hue Angle Composition. The CIECAM02 algorithm includes a forward model converting the CIEXYZ color space into the CIEJCh color space, and a backward model inversely converting the CIEJCh color space into the CIEXYZ color space. A concrete algorithm of the CIECAM02 used in the present invention is fully described in a 'Color Appearance Model' written by Mark D. Fairchild, or its Korean translation published in Jun. 29, 2007 by Sigma Press Co. The algorithm presented in these books is included in the present invention.

Subsequently, in the data correcting method according to an exemplary embodiment of the present invention, the CIEJCh values (JCh) are inversely converted into a CIEXYZ color space by sequentially applying illuminance parameters, besides the standard environment in Table 1, to the CIECAM02 backward algorithm (S3).

The CIEXYZ chromaticity coordinate values (X'Y'Z') of each illuminance which have been inversely converted through the CIECAM02 backward algorithm include optimum lightness, chroma, hue angle components at each corresponding illuminance.

Thereafter, in the data correcting method according to an exemplary embodiment of the present invention, the CIEXYZ chromaticity coordinate values (X'Y'Z') of each illuminance are inversely converted into the RGB color space by using the normalization algorithm as represented by Equation 2 shown below (S4):

$$\begin{bmatrix} R_{linear} \\ G_{linear} \\ B_{linear} \end{bmatrix} = \begin{bmatrix} 3.2410 & -1.5374 & -0.4986 \\ 0.9692 & 1.8760 & 0.0416 \\ 0.0556 & -0.2040 & 1.0570 \end{bmatrix} \begin{bmatrix} X \\ Y \\ Z \end{bmatrix}$$ [Equation 2]

$$C_{srgb} = \begin{cases} 12.92 C_{linear}, & C_{linear} \leq 0.0031308 \\ (1 + 0.055) C_{linear}^{1/2.4} - 0.055, & C_{linear} > 0.0031308 \end{cases}$$

Here, 'Csrgb' is a value obtained by normalizing RGB data to between 0 and 1.

The R'G'B' data calculated through the inverse conversion into the RGB color space is correction data which has been corrected to have optimum lightness, chroma, and hue angle fitting the visual sensitivity of the user under a corresponding illuminance condition.

And then, in the data correcting method according to an exemplary embodiment of the present invention, a look-up table is made by using an input/output mapping relationship between RGB-R'G'B' data of each illuminance determined through the steps S1 to S4 (S5).

The CIECAM02 takes much time to process data due to its complexity, which is, thus, cannot be directly handled by a data processing unit, such as a timing controller, of a display device. In addition, due to its hypertrophy, the CIECAM02 should use a large number of memories so as to be stored, and thus, actually, the CIECAM02 has not be applied for data processing of a display device. In the present invention, in order to apply the CIECAM02 algorithm, CIECAM02 algorithm execution results data were produced through various experimentations based on illuminance conditions in advance and made into a look-up table. The CIECAM02 algorithm can be significantly simplified by the look-up table, and can be easily mounted in an existing memory of a display device without having to additionally install a memory. The CIECAM02 execution results data stored in the memory can be adjusted by data correction/updating through a ROM writer.

Figure 3:
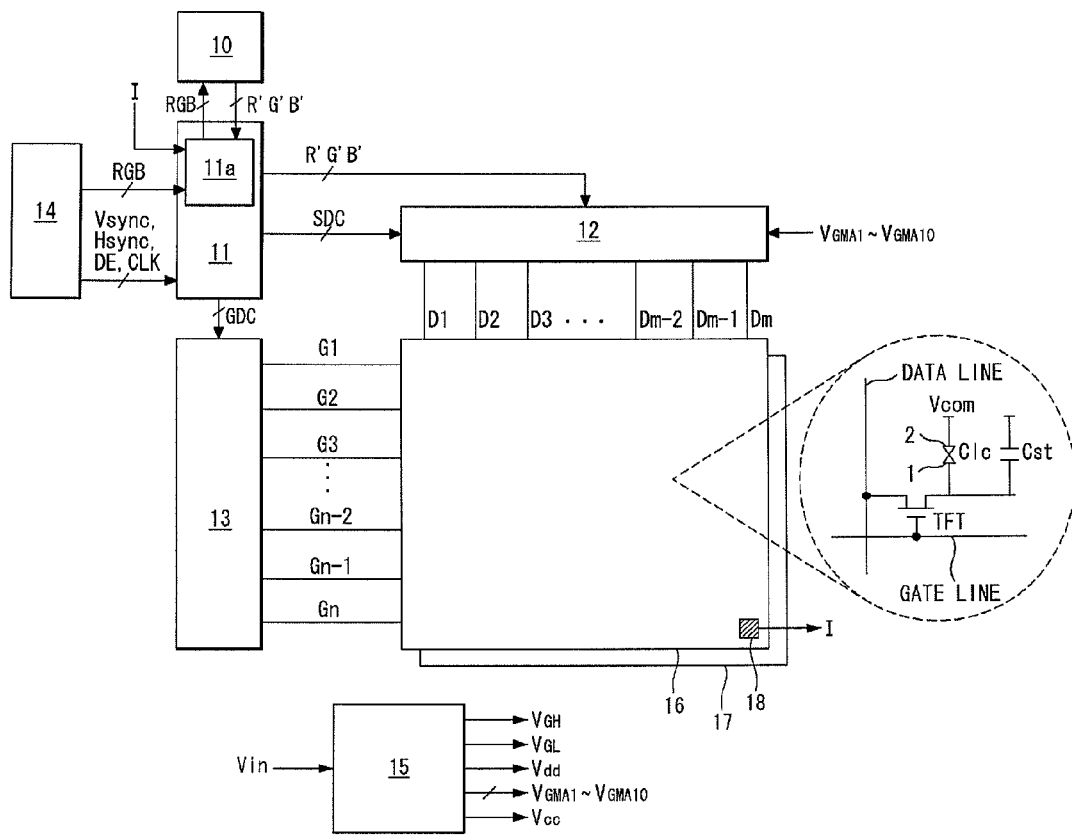
FIG. 3 is a schematic block diagram of an LCD according to an exemplary embodiment of the present invention.
Figure 4:
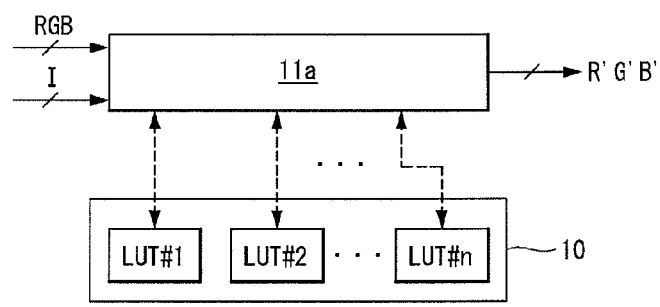
FIG. 4 illustrates a signal flow between a memory and a timing controller.

FIG. 3 is a schematic block diagram of a liquid crystal display (LCD) according to an exemplary embodiment of the present invention, and FIG. 4 illustrates a signal flow between a memory and a timing controller.

With reference to FIG. 3, the LCD according to an exemplary embodiment of the present invention includes a memory 10, a timing controller 11, a data driving circuit 12, a gate driving circuit 13, a system board 14, a module power source unit 15, a liquid crystal panel 16, and a backlight unit 17. The data driving circuit 12 and the gate driving circuit 13 constitute a display panel driving circuit.

As shown in FIG. 4, the memory 10 stores a plurality of look-up tables LUT#1 to LUT#N defining the input/output mapping relationship between RGB-R'G'B' data of each illuminance determined in steps S1 to S4 as described above. The look-up tables LUT#1 to LUT#n correspond to different illuminance conditions which have been previously set. The memory 10 may be implemented as an electrically erasable programmable read-only memory (EEPROM) and mounted on the timing controller 11.

The timing controller 11 includes a data processor 11a and a control signal generator (not shown).

The data processor 11a selects a look-up table corresponding to a pertinent illuminance condition based on illuminance information (I) inputted from an illuminance sensor 18 of the liquid crystal panel 16. And then, the data processor 11a corrects inputted RGB data into R'G'B' data (referred to as 'correction data (R'G'B')', hereinafter) by using the selected look-up table. The correction data (R'G'B') optimize the visual sensitivity characteristics of the user with respect to all the lightness, chroma, and color angle under the corresponding illuminance condition. The data processor 11a supplies the correction data (R'G'B') in a mini-low voltage differential signaling (LVDS) interface standard to the data driving circuit 12.

The control signal generator receives timing signals such as a vertical synchronization signal Vsync, a horizontal synchronization signal Hsync, a data enable signal DE, a dot clock CLK, and the like. The timing controller 11 generates a data control signal SDC for controlling an operation timing of the data driving circuit 12, and a gate control signal GDC for controlling an operation timing of the gate driving circuit 13 by using the timing signals Vsync, Hsync, DE, and CLK. The timing controller 11 may multiply the frequencies of the gate control signal GDC and the data control signal SDC by 60 xi Hz so that data inputted with a frame frequency of 60 Hz can be displayed in a pixel array of the liquid crystal panel 16 with a frame frequency of 60 xi (I is a positive integer of 2 or larger).

The data control signal SDC includes a source start pulse (SSP), a source sampling clock (SSC), a source output enable (SOE), a polarity control signal (POL), and the like. The SSP controls a data sampling start point of the data driving circuit 12. The SSC is a clock signal for controlling a sampling operation of data within source drive ICs of the data driving circuit 12 based on a rising or falling edge. The POL reverses the polarity of a data voltage outputted from the data driving circuit 12 by the period of N (N is a positive integer) horizontal internal. The SOE controls an output timing of the data driving circuit 12. When the polarity of the data voltage supplied to the data lines D1~Dm changes, the source drive ICs each supply a charge share voltage or a common voltage Vcom to the data lines D1~Dm in response to the pulse of the SOE, and supply the data voltage to the data lines D1~Dm during a low logical interval of the SOE. The charge share voltage is an average voltage of neighboring data lines to which data voltages of opposite polarities are supplied.

The GDC includes a gate start pulse (GSP), a gate shift clock (GSC), a gate output enable signal (GOE), and the like. The GSP controls a timing of a fist gate pulse. The GSC is a clock signal for shifting the GSP. The GOE controls an output timing of the gate driving circuit 13.

The system board 14 is connected to a broadcast receiving circuit and an external video source interface circuit to transmit RGB data, which has been inputted from the source circuit, to the timing controller 11 via a low voltage differential signaling (LVDS) interface or transition minimized differential signaling (TMDS) interface transmission circuit. Also, the system board 14 transmits the timing signals such as the vertical synchronization signal Vsync, the horizontal synchronization signal Hsync, the data enable signal DE, the dot clock CLK, and the like, to the timing controller 11. The system board 14 includes a graphic processing circuit, such as a scaler, for interpolating the resolution of RGB video data, which has been inputted from the broadcast receiving circuit or the external video source, suitably according to the resolution of the liquid crystal panel and performing signal interpolation thereon, and a power source circuit for generating a voltage Vin to be supplied to the module power source unit 15.

The data driving circuit 12 includes the plurality of source drive ICs. Each source drive IC samples and latches the correction data R'G'B' inputted from the timing controller 11 to convert the same into data in a parallel data format, in response to the data control signal SDC from the timing controller 11. Each source drive IC converts the correction data R'G'B', which have been converted into the parallel data transmission format, into an analog gamma compensation voltage by using positive polarity/negative polarity gamma reference voltages $V_{GMA1}$~$V_{GMA10}$ transferred from the module power source unit 15, to generate positive polarity/negative polarity video data voltages to be charged in the liquid crystal cells. Each source drive IC supplies the data voltage to the data lines D1~Dm while reversing the polarity of the positive polarity/negative polarity analog video data voltages under the control of the timing controller 11.

The gate driving circuit 13 includes a plurality of gate drive ICs. Each gate drive IC, including a shift register for sequentially shifting a gate driving voltage in response to the gate control signal GDC from the timing controller 11, sequentially supplies a gate pulse (or scan pulse) to the gate lines.

The liquid crystal panel 16 includes upper and lower glass substrates facing with a liquid crystal layer interposed therebetween. The liquid crystal panel 16 includes a pixel array displaying video data. The pixel array includes a thin film transistor (TFT) formed at each crossing of the data lines D1~Dm and the gate lines G1~Gn, and a pixel electrode 1 connected to the TFT. The pixel array includes a plurality of pixels each including R, G, and B liquid crystal cells. The liquid crystal cell Clc is driven by a voltage difference between the pixel electrode 1 that charges the data voltage via the TFT and a common electrode 2 to which a common voltage Vcom is applied, to adjust the transmission amount of light made incident from the backlight unit 17, thus displaying an image of video data.

Black matrixes, color filters, and common electrodes are formed on the upper glass substrate of the liquid crystal panel 16. In a vertical field driving scheme such as a TN mode or a VA mode, the common electrode 2 is formed on the upper glass substrate, and in a horizontal field (i.e., in-plane field) driving scheme such as an IPS mode or an FFS mode, the common electrode 2 is formed together with the pixel electrode 1 on the lower glass substrate.

A polarizer is attached to each of the upper and lower glass substrates of the liquid crystal panel 16, and an alignment film is formed thereon to set a pre-tilt angle of liquid crystal.

The illuminance sensor 18, including one or a plurality of optical sensors, senses illuminance of an external environment in which the liquid crystal panel 16 is disposed to generate illuminance information (I). The optical sensors constituting the illuminance sensor 18 may be attached to an outer side of the liquid crystal panel 16 so as to be exposed, or may be mounted on one side of the liquid crystal panel 16 through a TFT process.

The liquid crystal panel 16 may be implemented in any liquid crystal mode, as well as in the TN mode, the VA mode, the IPS mode, and the FFS mode, according to an exemplary embodiment of the present invention. In addition, the LCD according to an exemplary embodiment of the present invention can be implemented in any form of a transmissive LCD, transflective LCD, a reflective LCD, and the like. The transmissive LCD and the transflective LCD require the backlight unit 17. The backlight unit 17 may be implemented as a direct type backlight unit or an edge type backlight unit.

The mode power source unit 15 generates driving voltages of the liquid crystal panel 16 by adjusting the voltage Vin inputted from the power source circuit of the system board 14. The driving voltages of the liquid crystal panel 16 may include a high potential power source voltage Vdd of 8V or lower, a logic power source voltage Vcc of about 3.3V, a gate high voltage (VGH) of 15V or higher, a gate low voltage (VGL) of −3V or lower, a common voltage Vcom ranging from 7V to 8V, and the positive polarity/negative polarity gamma reference voltages $V_{GMA1}$~$V_{GMA10}$, and the like.

Figure 5:
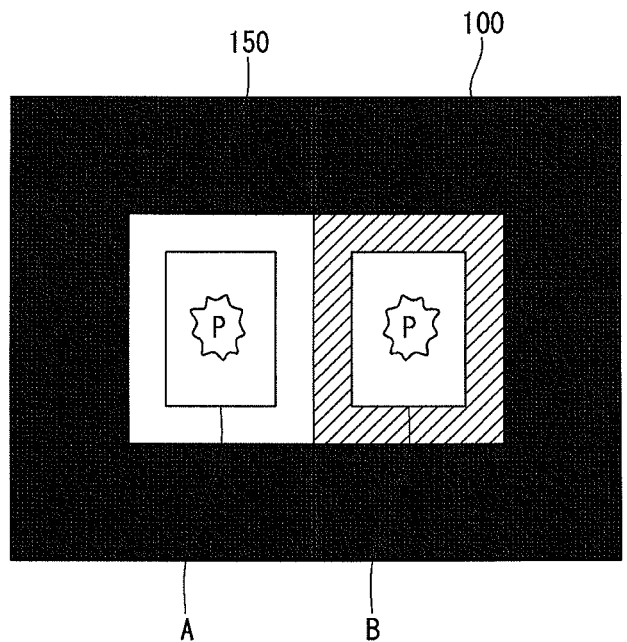
FIG. 5 is a schematic view of a device for experimenting on a view appreciation difference of the user according to illuminance conditions.

FIG. 5 is a schematic view of a device for experimenting on a view appreciation difference of the user according to illuminance conditions.

As shown in FIG. 5, a booth 150 having two different illuminance areas is installed in a dark room 100. When the same images (P) are displayed on two LCDs (A and B) placed at the different illuminance regions, an observer would feel different on the same images (P) displayed on the LCDs (A and B).

Figure 6:
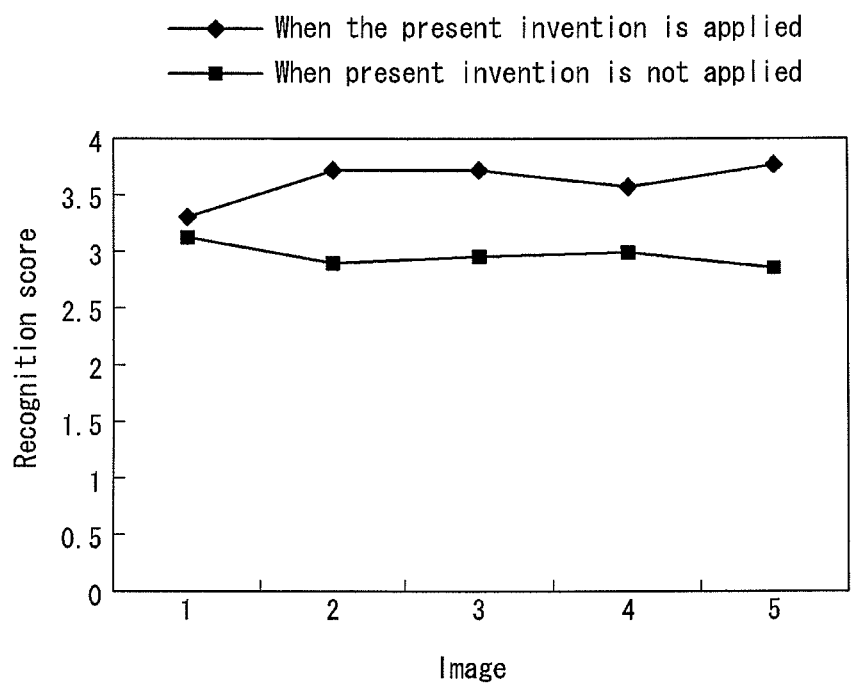
FIGS. 6 and 7 are graphs showing examples of experimentation results according to illuminance conditions.

For example, as shown in FIG. 6, in a state that a bright illumination is applied to the region of the booth 150 where the LCD (A) is disposed and no illumination is applied to the region of the booth 150 where the LCD (B) is disposed, when the same images (P) are displayed on both LCDs (A and B), a recognition score of the observer with respect to the same images (P) is generally as low as about 3. Here, the recognition score indicates the degree at which the same images are felt to be the same under the different illuminations. Meanwhile, when the data correction process using the CIECAM02 algorithm (the illuminance parameter of the dark environment is applied) as described above is performed, the recognition score of the observer with respect to the same images (P) is improved to be about 3.5 to 4.

Figure 7:
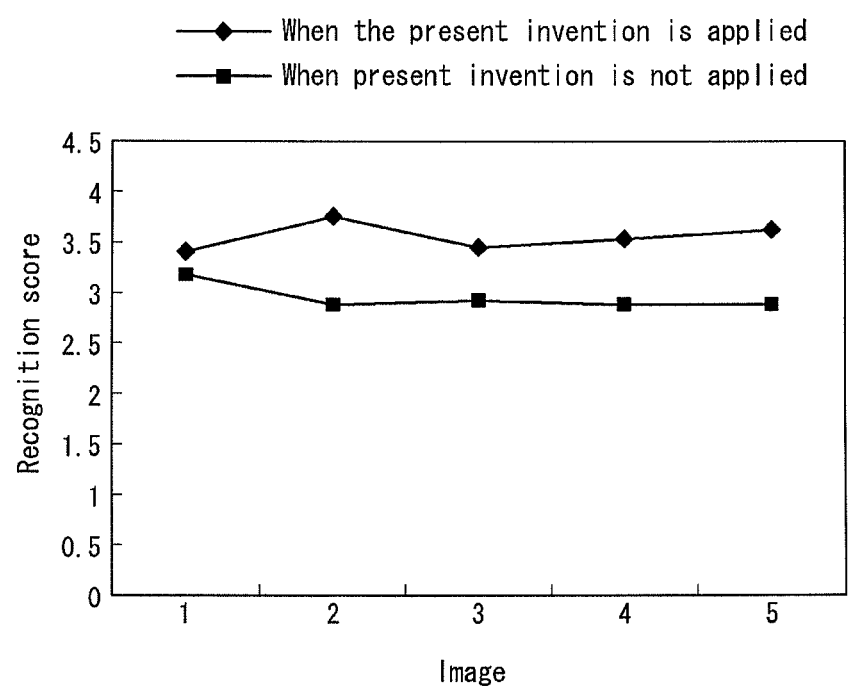

In addition, as shown in FIG. 7, in a state that a bright illumination is applied to the region of the booth 150 where the LCD (A) is disposed and a dim illumination is applied to the region of the booth 150 where the LCD (B) is disposed, when the same image (P) are displayed on the both LCDs (A and B), a recognition score of the observer with respect to the same images (P) is generally as low as 3 to 3.5. Meanwhile, when the data correction process using the CIECAM02 algorithm (the illuminance parameter of the dim environment is applied) as described above is performed, the recognition score of the observer with respect to the same images (P) is improved to be about 3.5 to 4.

As described above, the data correcting method and the LCD using the same according to the exemplary embodiments of the present invention have the advantage that the lightness, chroma, and hue angle of an image can be optimally changed according to an ambience illuminance to fit the visual sensitivity, thus improving a picture quality.

In addition, by making the look-up table with the CIECAM02 algorithm execution results, any additional component cost for implementing an algorithm is not incurred.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method for correcting video input data to display an image on a Liquid Crystal Display (LCD) panel, wherein the image is displayed by continuously scanning and outputting of the video input data, the method comprising:
   detecting illuminance information external to the LCD panel surrounding;
   converting the video input data into XYZ color space data;
   utilizing the detected illuminance information to obtain reference illuminance parameters;
   if it is determined that the reference illuminance parameters are different from those in a standard environment:
   applying the parameters of the standard environment to execute a CIECAM02 forward algorithm to convert the XYZ color space data into JCh color space data;
   sequentially applying the referenced illuminance parameters other than the standard environment to execute a CIECAM02 backward algorithm to inversely convert the JCh color space data into the XYZ color space data, wherein the reference illuminance parameters other than the standard environment comprises parameters pertaining to a dim environment and a dark environment;
   inversely converting the inversely converted XYZ color space data into an RGB color space to produce correction data of each illuminance;
   making a look-up table by mapping the produced correction data of each illuminance to the video input data; and
   displaying the correction data on the LCD panel, if it is determined that the reference illuminance parameters are the same as those in the standard environment, directly displaying the video input data on the LCD panel without performing data correction.

2. The method of claim 1, wherein the correction data is determined such that it reduces a visual sensitivity difference with respect to an image between the standard environment and an illuminance environment besides the standard environment.

3. The method of claim 2, wherein the visual sensitivity difference comprises a visual sensitivity difference with respect to the lightness, chroma, and hue angle of the image.

4. A liquid crystal display (LCD) device comprising:
a liquid crystal panel which displays an image, wherein the liquid crystal panel comprises an illuminance sensor which detects illuminance information external to the liquid crystal panel surrounding;
a memory configured to store a plurality of previously made look-up tables including correction data of each illuminance produced through an algorithm;
a data processing unit configured to select a look-up table based on the illuminance information detected by the illuminance sensor, wherein the data processing unit utilizes the detected illuminance information to execute the algorithm to correct video input data, using the correction data from the selected look-up table; and
a display panel driving circuit configured to display the correction data on the liquid crystal panel,
wherein the algorithm comprising:
converting the video input data into XYZ color space data;
utilizing the detected illuminance information to obtain reference illuminance parameters;
if it is determined that the reference illuminance parameters are different from those in a standard environment:
applying the parameters of the standard environment to execute a CIECAM02 forward algorithm to convert the XYZ color space data into JCh color space data;
sequentially applying the referenced illuminance parameters other than the standard environment to execute a CIECAM02 backward algorithm to inversely convert the JCh color space data into the XYZ color space data, wherein the reference illuminance parameters other than the standard environment comprises parameters pertaining to a dim environment and a dark environment; and
inversely converting the inversely converted XYZ color space data into an RGB color space to produce the correction data of each illuminance,
if it is determined that the reference illuminance parameters are the same as those in the standard environment, directly displaying the video input data on the LCD panel without performing data correction.

5. The device of claim 4, further comprising:
a timing controller configured to control an operational timing of the display panel driving circuit,
wherein the memory and the data processing unit are installed within the timing controller.

6. The device of claim 4, wherein the correction data is determined such that it reduces a visual sensitivity difference with respect to an image between the standard environment and an illuminance environment besides the standard environment.

7. The device of claim 6, wherein the visual sensitivity difference comprises a visual sensitivity difference with respect to the lightness, chroma, and hue angle of the image.

* * * * *